(12) United States Patent
Kurian

(10) Patent No.: US 11,526,619 B2
(45) Date of Patent: Dec. 13, 2022

(54) SYSTEM FOR SECURING AND ALLOWING ACCESS TO ELECTRONIC DATA IN A DATA STORAGE CONTAINER

(71) Applicant: BANK OF AMERICA CORPORATION, Charlotte, NC (US)

(72) Inventor: Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 558 days.

(21) Appl. No.: 16/456,168

(22) Filed: Jun. 28, 2019

(65) Prior Publication Data

US 2020/0410120 A1 Dec. 31, 2020

(51) Int. Cl.
*G06F 21/62* (2013.01)
*G06F 21/44* (2013.01)
*G06F 3/06* (2006.01)

(52) U.S. Cl.
CPC ............ *G06F 21/62* (2013.01); *G06F 3/0622* (2013.01); *G06F 3/0647* (2013.01); *G06F 3/0673* (2013.01); *G06F 21/44* (2013.01)

(58) Field of Classification Search
CPC ........ G06F 21/62; G06F 21/44; G06F 3/0673; G06F 3/0647; G06F 3/0622; G06F 21/6218
See application file for complete search history.

(56) References Cited

U.S. PATENT DOCUMENTS

| | | | |
|---|---|---|---|
| 8,694,497 B2 | 4/2014 | Bacher et al. | |
| 8,793,285 B2 | 7/2014 | Han | |
| 8,825,744 B2 | 9/2014 | Wang et al. | |
| 8,825,955 B2 | 9/2014 | Sleiman et al. | |
| 8,832,162 B2 | 9/2014 | Greenspan et al. | |
| 8,930,655 B2 | 1/2015 | Abzarian et al. | |
| 9,436,400 B2 | 9/2016 | Abzarian et al. | |
| 9,542,495 B2 | 1/2017 | Hanses et al. | |
| 10,057,246 B1 * | 8/2018 | Drozd | G06F 21/335 |
| 2007/0208823 A1 * | 9/2007 | Shannon | G06F 16/907 709/217 |
| 2008/0133269 A1 * | 6/2008 | Ching | G06Q 10/10 705/2 |
| 2008/0301158 A1 * | 12/2008 | Brown | G16H 40/40 |

(Continued)

*Primary Examiner* — Mohammad W Reza
(74) *Attorney, Agent, or Firm* — Moore & Van Allen PLLC; Nicholas C. Russell

(57) ABSTRACT

Embodiments of the present invention provide a system for securing and allowing access to electronic data in a data storage container. The system is configured for identifying initiation of a connection with an data storage container, determining establishment of the connection with the data storage container, instantaneously crawling into the data storage container to access data that is associated with the data storage container, instantaneously performing one or more operations associated with the data, storing information associated with the one or more operations in a data store, identifying initiation of a connection with an entity system, determining establishment of the connection with the entity system, instantaneously transferring the information associated with the one or more operations to the entity system, and performing one or more actions, via one or more applications stored on the entity system, utilizing the information associated with the one or more operations.

12 Claims, 5 Drawing Sheets

(56) References Cited

U.S. PATENT DOCUMENTS

| | | | |
|---|---|---|---|
| 2010/0226223 A1* | 9/2010 | Kondo | G11B 20/10527 |
| 2013/0159091 A1* | 6/2013 | Harper | G06Q 30/02 |
| | | | 705/14.41 |
| 2014/0280367 A1 | 9/2014 | Bloching et al. | |
| 2014/0379921 A1 | 12/2014 | Morley et al. | |
| 2015/0039810 A1* | 2/2015 | Chou | G06F 12/0246 |
| | | | 711/103 |
| 2016/0098574 A1 | 4/2016 | Bargagni | |

\* cited by examiner

SYSTEM FOR SECURING AND ALLOWING ACCESS TO ELECTRONIC DATA IN A DATA STORAGE CONTAINER

BACKGROUND

There exists a need for a system to secure and allow access to electronic data in a data storage container.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for securing and allowing access to electronic data in a data storage container. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies initiation of a connection with an data storage container, determines establishment of the connection with the data storage container, instantaneously crawls into the data storage container to access data that is associated with the data storage container, and instantaneously performs one or more operations associated with the data via an artificial intelligence engine.

In some embodiments, instantaneously performing the one or more operations comprises instantaneously performing analytics on the data.

In some embodiments, the present invention stores information associated with the analytics in a data store.

In some embodiments, the present invention identifies initiation of a connection with an entity system, determines establishment of the connection with the entity system, instantaneously transfers the information associated with the analytics to the entity system, and performs one or more actions, via one or more applications stored on the entity system, utilizing the information associated with the analytics.

In some embodiments, the present invention stores the data in a data store. In some embodiments, the present invention stores the data in a data store based on identifying a hardware identification associated with the data storage container, generating a token using the hardware identification, assigning the token to the data and store tokenized data in the data store.

In some embodiments, the present invention transfers the data to at least one other data storage container, wherein transferring the data to the at least one other data storage container is based on authenticating the one other data storage container using at least one hardware identification associated with the at least one other data storage container.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
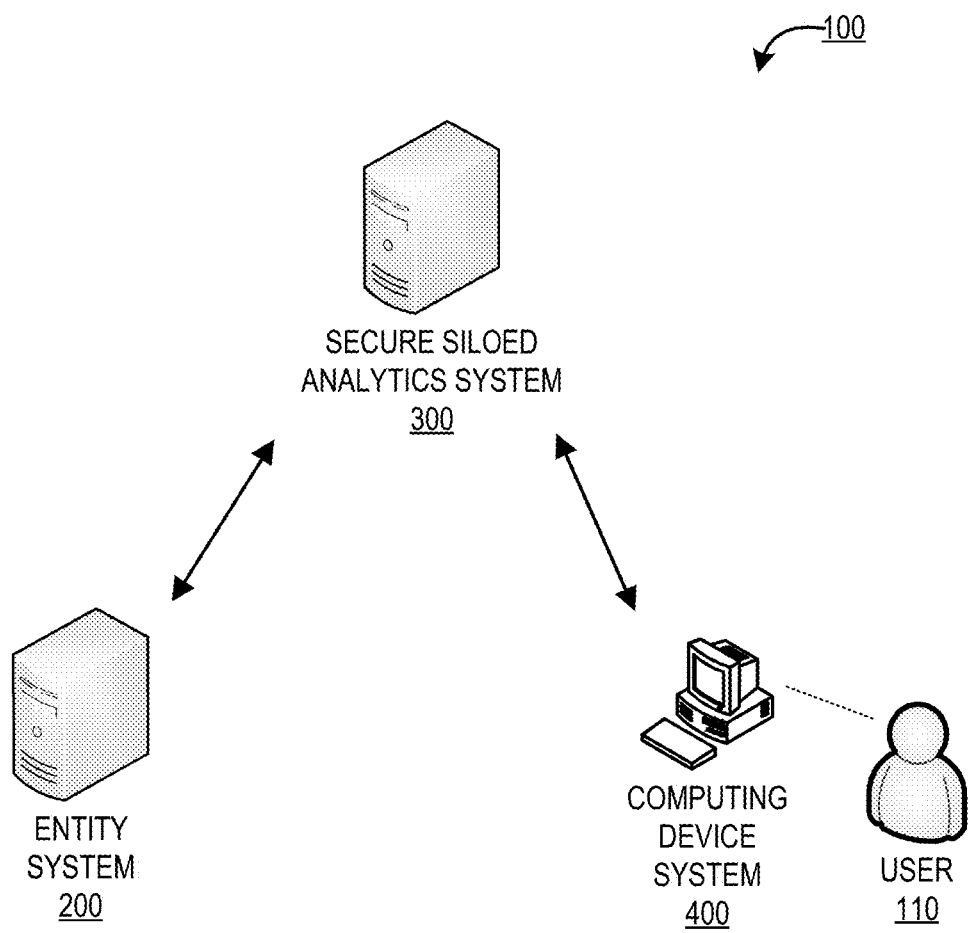
Figure 2:
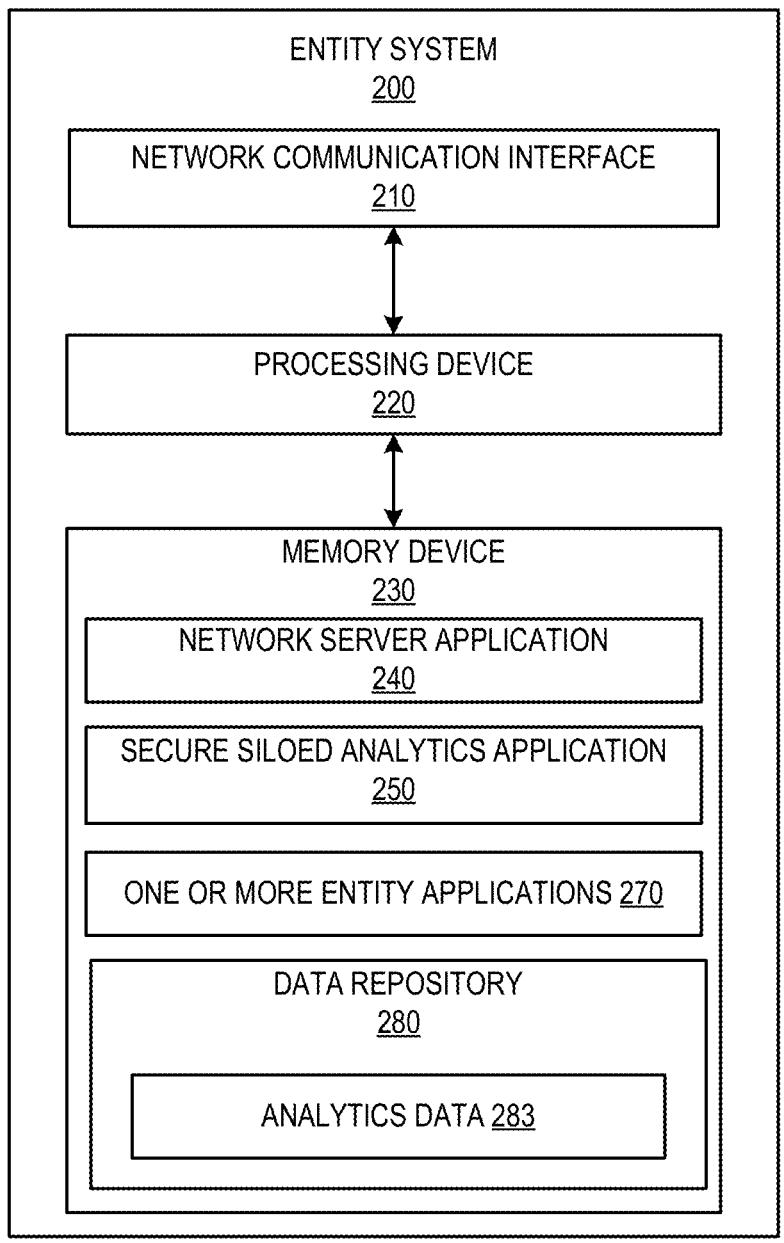
Figure 3:
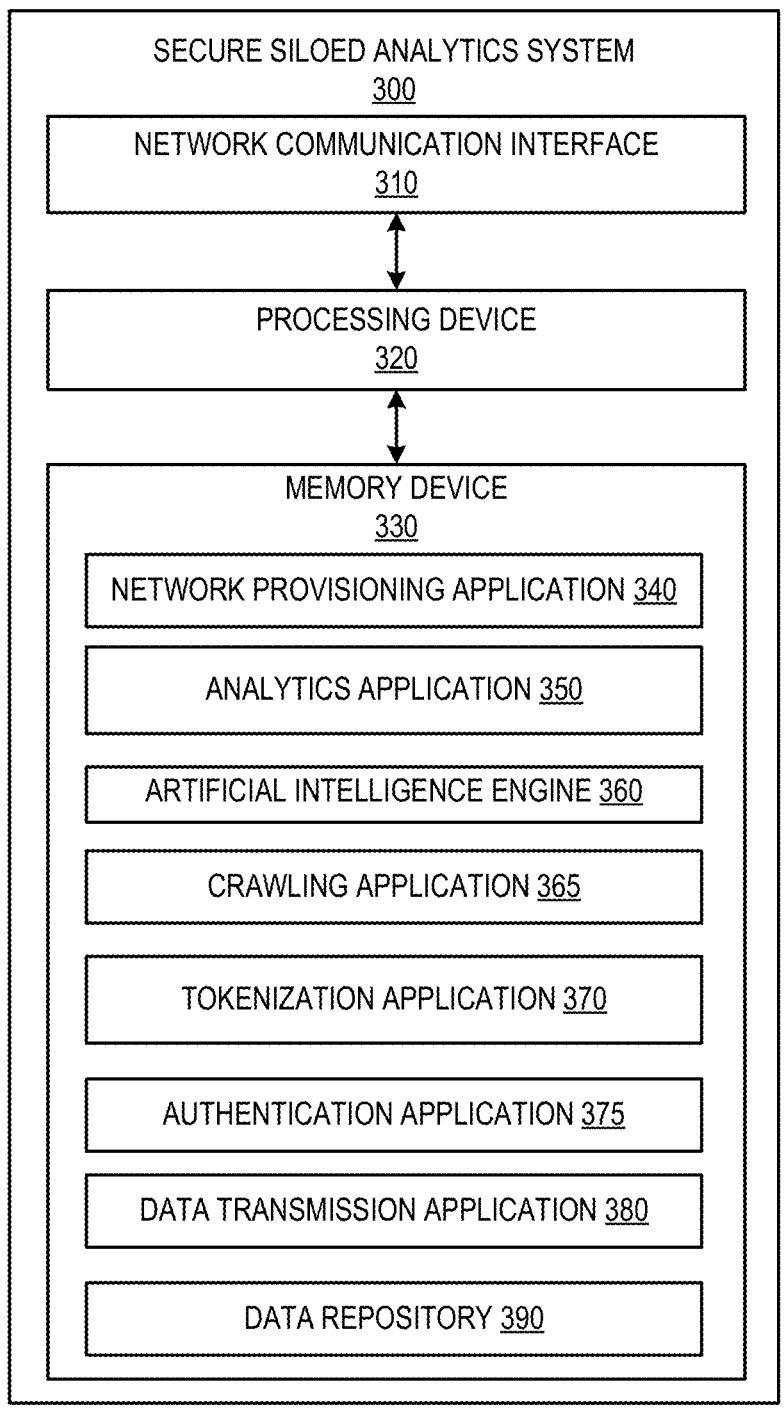
Figure 4:
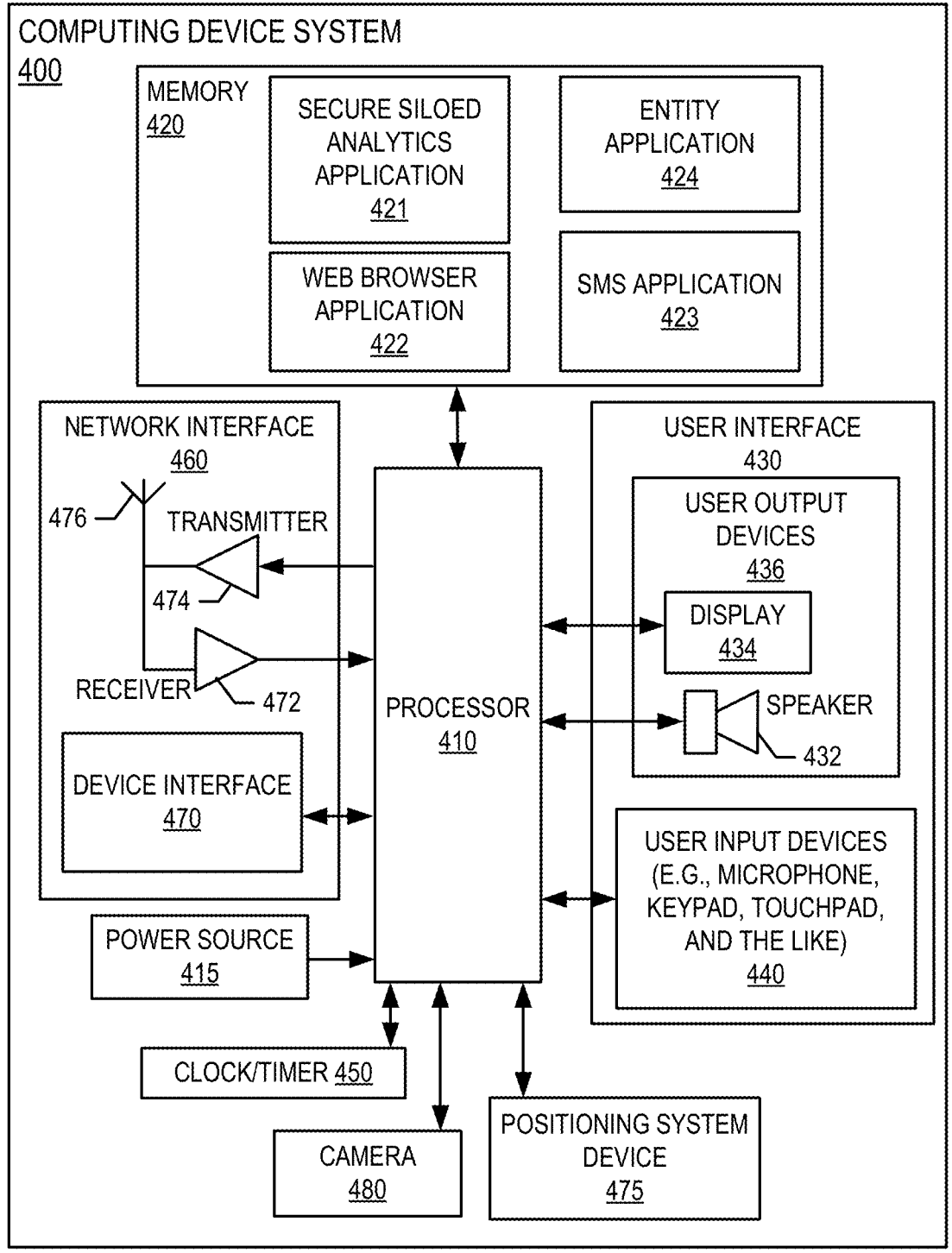
Figure 5:
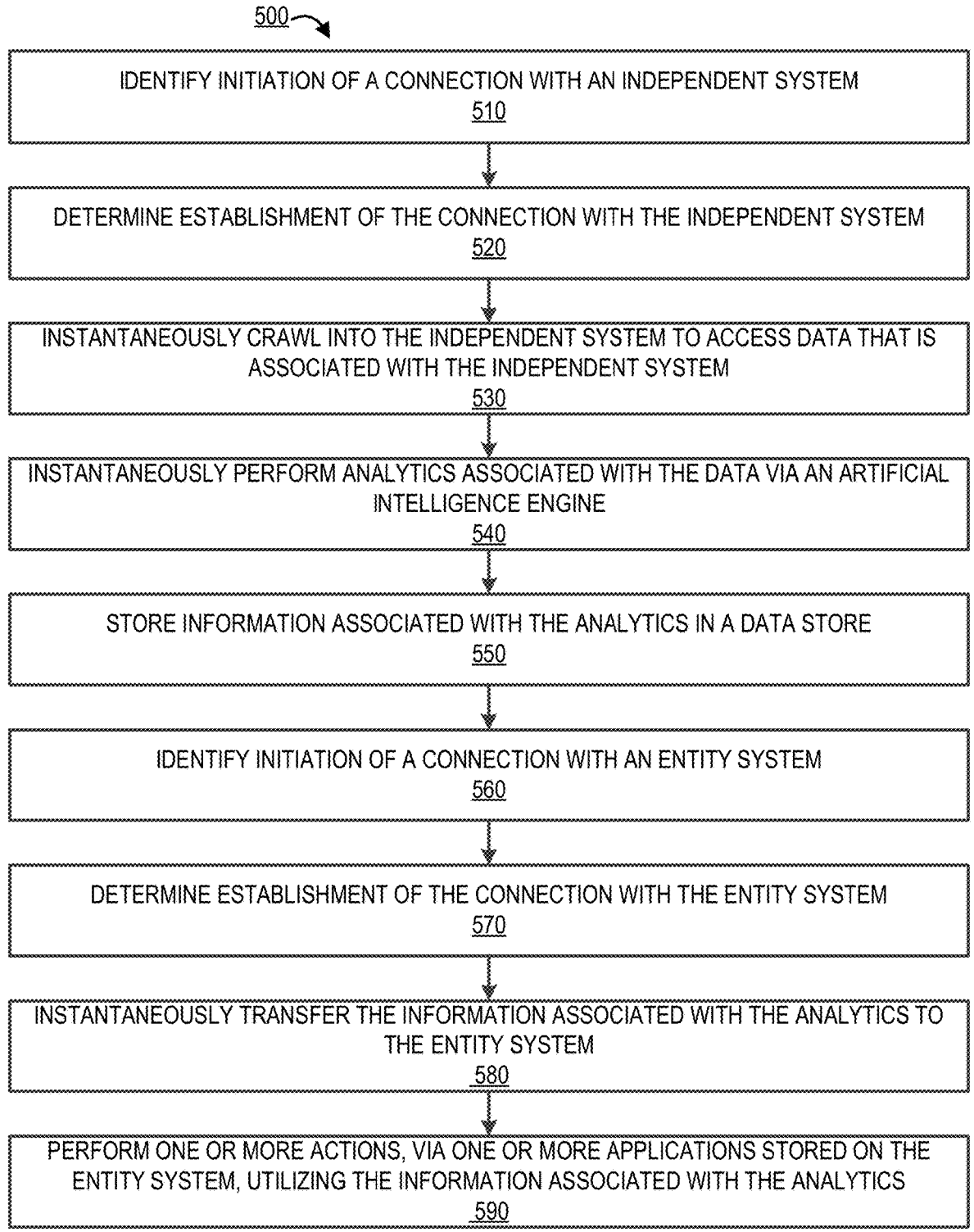

Having thus described embodiments of the invention in general terms, reference will now be made the accompanying drawings, wherein:

FIG. 1 provides a block diagram illustrating a secure siloed system environment for performing analytics on data that is associated with one or more independent devices, in accordance with an embodiment of the invention;

FIG. 2 provides a block diagram illustrating the entity system 200 of FIG. 1, in accordance with an embodiment of the invention;

FIG. 3 provides a block diagram illustrating a secure siloed analytics system 300 of FIG. 1, in accordance with an embodiment of the invention;

FIG. 4 provides a block diagram illustrating the computing device system 400 of FIG. 1, in accordance with an embodiment of the invention;

FIG. 5 provides a flowchart illustrating a process flow for securely performing analytics on data that is associated with one or more independent devices, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with some embodiments of the invention, the terms "entity" may include any organization that processes financial transactions including, but not limited to, banks, credit unions, savings and loan associations, investment companies, stock brokerages, resource management firms, insurance companies and the like. In some other embodiments, the entity may be a non-financial organization. It will be appreciated by someone with ordinary skill in the art that the user or customer may be a customer of the entity.

Many of the example embodiments and implementations described herein contemplate interactions engaged in by a user with a computing device and/or one or more communication devices and/or secondary communication devices. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

Conventional systems transfer and store data to a cloud environment, where the data is accessed by multiple users to perform multiple operations (e.g., analytics) on the data. The cloud environment may be maintained by third party entities and transferring and storing data to the cloud environment may expose the data to various vulnerabilities. The conventional systems do not secure and/or allow access to data stored in data storage containers (e.g., entity systems, computing device systems, or the like). As such, there exists a need for an improved system to securely access and perform analytics on data that is stored on multiple independent computing devices. The system of the present invention provides a unique solution to solve the above mentioned problems as explained in detail below.

FIG. 1 provides a block diagram illustrating a system environment 100 for securely performing analytics on data that is stored on multiple independent computing devices, in accordance with an embodiment of the invention. As illustrated in FIG. 1, the environment 100 includes a secure siloed analytics system 300, entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200.

The entity system(s) 200 may be any system owned or otherwise controlled by an entity to support or perform one or more process steps described herein. In some embodiments, the managing entity is a financial institution. In some embodiments, the managing entity is a non-financial institution.

The secure siloed analytics system 300 is a system of the present invention for performing one or more process steps described herein. In some embodiments, the secure siloed analytics system 300 may be a portable system that can be connected to the entity system 200 and the computing device system 400. After establishment of a connection between the secure siloed analytics system 300 and the entity system 200 or the computing device system 400, the secure siloed analytics system 300 performs one or more functions as described in FIG. 5.

The computing device system 400 may be a system owned or controlled by the user 110. As such, the computing device system 400 may be a computing device of the user 110. In general, the computing device system 400 communicates with the user 110 via a user interface of the computing device system 400.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by an entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a secure siloed analytics application 250, one or more entity applications 270, and a data repository 280 comprising analytics data 283. The computer-executable program code of the network server application 240, the secure siloed analytics application 250, and the one or more entity applications 270 to perform certain logic, data-extraction, and data-storing functions of the entity system 200 described herein, as well as communication functions of the entity system 200. In some embodiments, the secure siloed analytics application 250 may be not be present in the system. In such an embodiment, the one or more instructions associated with the secure siloed analytics application 250 will be performed by the secure siloed analytics system 300 upon establishing a connection with the entity system 200.

The network server application 240, the secure siloed analytics application 250, and the one or more entity applications 270, are configured to store data in the data repository 280 or to use the data stored in the data repository 280 when communicating with the secure siloed analytics system 300. In some embodiments, the entity system 200 may receive instructions from the secure siloed analytics system 300 via the secure siloed analytics application 250 to perform certain operations, secure siloed analytics application 250 may be provided by the secure siloed analytics system 300. In some embodiments, the secure siloed analytics application 250 may be automatically installed in the entity system 200 after establishment of the connection with the secure siloed analytics system 300. The one or more entity applications 270 may be any of the applications used, created, modified, and/or managed by the entity system 200.

FIG. 3 provides a block diagram illustrating the secure siloed analytics system 300 in greater detail, in accordance with embodiments of the invention. As illustrated in FIG. 3, in one embodiment of the invention, the secure siloed analytics system 300 includes one or more processing devices 320 operatively coupled to a network communication interface 310 and a memory device 330. In some embodiments, the secure siloed analytics system 300 does not include the network communication interface 310. In some embodiments, the secure siloed analytics system may have the ability to connect to a network. In some other embodiments, the secure siloed analytics system may not have the ability to connect to the network.

It should be understood that the memory device 330 may include one or more databases or other data structures/repositories. The memory device 330 also includes computer-executable program code that instructs the processing device 320 to perform certain functions of the secure siloed analytics system 300 described herein. For example, in one embodiment of the secure siloed analytics system 300, the memory device 330 includes, but is not limited to, a network provisioning application 340, an analytics application 350, an artificial intelligence engine 360, a crawling application 365, a tokenization application 370, an authentication application 375, a data transmission application 380, and a data repository 390 comprising data processed or accessed by one or more applications in the memory device 330. The computer-executable program code of the network provisioning application 340, the analytics application 350, the artificial intelligence engine 360, the crawling application 365, the tokenization application 370, the authentication application 375, and the data transmission application 380 may instruct the processing device 320 to perform certain logic, data-processing, and data-storing functions of the secure siloed analytics system 300 described herein, as well as communication functions of the secure siloed analytics system 300.

The network provisioning application 340, the analytics application 350, the artificial intelligence engine 360, the crawling application 365, the tokenization application 370, the authentication application 375, and the data transmission application 380 are configured to invoke or use the data in the data repository 390 while interacting with the entity system 200 or the computing device system 400. In some embodiments, the analytics application 350, the artificial intelligence engine 360, the crawling application 365, the tokenization application 370, the authentication application 375, and the data transmission application 380 may store the data extracted or received from the entity system 200, and the computing device system 400 in the data repository 390. In some embodiments, the network provisioning application 340, the analytics application 350, the artificial intelligence engine 360, the crawling application 365, the tokenization application 370, the authentication application 375, and the data transmission application 380 may be a part of a single application. In some embodiments, the network provisioning application 340, the analytics application 350, the artificial intelligence engine 360, the crawling application 365, the tokenization application 370, the authentication application 375, and the data transmission application 380 may be responsible for performing one or more steps described in process flow 500 of FIG. 5. In some embodiments, the memory device 330 may comprise deep learning neural networks. In some embodiments, the memory device 330 may comprise machine learning models.

FIG. 4 provides a block diagram illustrating a computing device system 400 of FIG. 1 in more detail, in accordance with embodiments of the invention. However, it should be understood that a computer is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, mobile device, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of a wireless network. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RF ID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a secure siloed analytics application 421, entity application 424. These applications also typically instructions to a graphical user interface (GUI) on the display 430 that allows the user 110 to interact with the entity system 200, the secure siloed analytics system 300, and/or other devices or systems. In some embodiments, the secure siloed analytics application 421 may not be present in the memory 420. In such embodiments, the secure siloed analytics application 421 may be installed automatically upon establishing a connection with the secure siloed analytics system 300. The memory 420 of the computing device system 400 may comprise a Short Message Service (SMS) application 423 configured to send, receive, and store data, information, communications, alerts, and the like via the wireless telephone network 152. In some embodiments, the secure siloed analytics application 421 provided by the secure siloed analytics system 300 allows the user 110 to access the data stored in the secure siloed analytics system 300. The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow employed by a secure siloed system for performing analytics on data that is associated with one or more independent devices, in accordance with an embodiment of the invention. In some embodiments of the present invention, the secure siloed system may be a portable device. As shown in block 510, the system identifies initiation of a connection with an independent system. The independent system may be a computing device system (e.g., a user computing system) or an entity system. The connection may be a physical connection (e.g., connecting the system physically to the independent system). In an exemplary embodiment, the system may identify that a user plugged in the system into the computing device system and may identify initiation of the connection with the computing device system. In some embodiments, upon plugging in the system into the computing device system, the system may automatically perform one or more steps to complete the setup process.

As shown in block 520, the system determines establishment of the connection with the independent system. Once the setup process is complete, the system determines that the connection has been established.

As shown in block 530, the system instantaneously crawls into the independent system to access data that is associated with the independent system. The data may include any type of data present on the computing device system including, but not limited to, application level data, user data, hardware related data, or the like. In some embodiments, the system may crawl into the independent system to access data only after receiving permissions from a user that is associated with the independent system. In some such embodiments, the user may allow access to some data stored on the independent system. For example, when the system prompts the user to provide permissions, the user may choose to provide access to the application level data and hardware related data and not the user data.

In some embodiments, after accessing the data, the system may store the data in a data store. The data store is a memory component of the system. In some embodiments, the system may tokenize the data before storing the data in the data store. Tokenizing the data may comprise identifying a hardware id associated with the independent system and assigning the hardware id to the data accessed from the independent system. For example, the system may identify a serial number associated with the independent system, tokenize the data by assigning the serial number to the data accessed from the independent system, store the tokenized data in the data store.

As shown in block 540, the system instantaneously performs analytics associated with the data via an artificial intelligence engine. The system may perform data analytics on the accessed data to identify patterns, forecast events, or the like. The system may automatically determine the type of analytics that is to be performed based on a type of a system that the system of the present invention is connected to. For example, when the system is connected to a user computing system, the system may perform analytics to identify user patterns. In some embodiments, if the system is connected to an entity system, the system may perform analytics to forecast events utilizing the tokenized data stored in the data store. As shown in block 550, the system stores information associated with the analytics in a data store. For example, the system may store the identified patterns in the data store.

As shown in block 560, the system identifies initiation of a connection with an entity system. As shown in block 570, the system determines establishment of the connection with the entity system. The system determines the establishment of the connection with the entity system as explained above.

As shown in block 580, the system instantaneously transfers the information associated with the analytics to the entity system. The system transfer the information based on determining that the entity system has permission to access the information. For example, if the system is connected to a user computing system, the system may not transfer analytics related information to the user computing system. As shown in block 590, the system performs one or more actions, via one or more applications stored on the entity system, utilizing the information associated with the analytics. For example, the system may use the information associated with the analytics to improve performance of the one or more applications. In another example, the system may utilize the information to cause an entity application (e.g., banking application) to perform better and improve user experience of users that are using the entity application without exposing the data to a third party system (e.g., cloud environment), thereby protecting the data.

In some embodiments, the system may be connected to another independent system, where the independent system may be an entity system or another independent computing device system. In such an embodiment, the system may transfer the data associated with the computing device system that is stored in the data store to another independent system based on identifying that the another independent system has permissions to receive to the data. This eliminates the need to upload the data to a cloud environment and thereby protects the data. The system also provides instant data transfer and on-the-go analytics capabilities. The system may determine that the another independent system has the permissions based on crawling into the another independent system.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A portable secure siloed system for securing and allowing access to electronic data in a data storage container, the system comprising:
   at least one non-transitory storage device; and
   at least one processing device coupled to the at least one non-transitory storage device, wherein the at least one processing device is configured to:
      store the data in a data store based on:
         identifying a hardware identification associated with the data storage container;
         generating a token using the hardware identification; and
         assigning the token to the data and store tokenized data in the data store;
      identify initiation of a connection with the data storage container based on determining that a user plugged in the portable secure siloed system to the data storage container, wherein the data storage container is an independent system;
      in response to initiation of the connection with the data storage container, automatically perform one or more steps to complete set up process;
      determine establishment of the connection with the data storage container;
      in response to determining establishment of the connection, instantaneously crawl into the data storage container to access data that is associated with the data storage container; and
      instantaneously perform one or more operations associated with the data via an artificial intelligence engine, wherein the one or more operations comprise at least instantaneously performing analytics on the data, wherein type of the analytics performed is based on a type of the data storage container.

2. The system of claim 1, wherein the at least one processing device is further configured to store information associated with the analytics in a data store.

3. The system of claim 2, wherein the at least one processing device is configured to:
   identify initiation of a connection with an entity system;
   determine establishment of the connection with the entity system;
   instantaneously transfer the information associated with the analytics to the entity system; and
   perform one or more actions, via one or more applications stored on the entity system, utilizing the information associated with the analytics.

4. The system of claim 1, wherein the at least one processing device is configured to transfer the data to at least one other data storage container, wherein transferring the data to the at least one other data storage container is based on authenticating the one other data storage container using at least one hardware identification associated with the at least one other data storage container.

5. A computer program product in a portable secure siloed system for securing and allowing access to electronic data in a data storage container, the computer program product comprising a non-transitory computer-readable storage medium having computer executable instructions for causing a computer processor to perform the steps of:
   storing the data in a data store based on:
      identifying a hardware identification associated with the data storage container;
      generating a token using the hardware identification; and
      assigning the token to the data and store tokenized data in the data store;
   identifying initiation of a connection with the data storage container based on determining that a user plugged in the portable secure siloed system to the data storage container, wherein the data storage container is an independent system;
   in response to initiation of the connection with the data storage container, automatically performing one or more steps to complete set up process;
   determining establishment of the connection with the data storage container;
   in response to determining establishment of the connection, instantaneously crawling into the data storage container to access data that is associated with the data storage container; and
   instantaneously performing one or more operations associated with the data via an artificial intelligence engine, wherein the one or more operations comprise at least instantaneously performing analytics on the data, wherein type of the analytics performed is based on a type of the data storage container.

6. The computer program product of claim 5, wherein the computer executable instructions cause the computer processor to store information associated with the analytics in a data store.

7. The computer program product of claim 6, wherein the computer executable instructions cause the computer processor to:
identify initiation of a connection with an entity system;
determine establishment of the connection with the entity system;
instantaneously transfer the information associated with the analytics to the entity system; and
perform one or more actions, via one or more applications stored on the entity system, utilizing the information associated with the analytics.

8. The computer program product of claim 5, wherein the computer executable instructions further cause the computer processor to transfer the data to at least one other data storage container, wherein transferring the data to the at least one other data storage container is based on authenticating the one other data storage container using at least one hardware identification associated with the at least one other data storage container.

9. A computerized method performed by a portable secure siloed system for securing and allowing access to electronic data in a data storage container, the method comprising:
storing the data in a data store based on:
identifying a hardware identification associated with the data storage container;
generating a token using the hardware identification; and
assigning the token to the data and store tokenized data in the data store;
identifying initiation of a connection with the data storage container based on determining that a user plugged in the portable secure siloed system to the data storage container, wherein the data storage container is an independent system;
in response to initiation of the connection with the data storage container, automatically performing one or more steps to complete set up process;
determining establishment of the connection with the data storage container;
in response to determining establishment of the connection, instantaneously crawling into the data storage container to access data that is associated with the data storage container; and
instantaneously performing one or more operations associated with the data via an artificial intelligence engine, wherein the one or more operations comprise at least instantaneously performing analytics on the data, wherein type of the analytics performed is based on a type of the data storage container.

10. The computerized method of claim 9, wherein the method further comprises store information associated with the analytics in a data store.

11. The computerized method of claim 10, wherein the method further comprises:
identifying initiation of a connection with an entity system;
determining establishment of the connection with the entity system;
instantaneously transferring the information associated with the analytics to the entity system; and
performing one or more actions, via one or more applications stored on the entity system, utilizing the information associated with the analytics.

12. The computerized method of claim 9, wherein the method further comprises transferring the data to at least one other data storage container, wherein transferring the data to the at least one other data storage container is based on authenticating the one other data storage container using at least one hardware identification associated with the at least one other data storage container.

* * * * *